April 24, 1962  P. D. ABBOTT  3,031,208
UNIVERSAL TRACTOR HITCH

Filed Oct. 25, 1960  3 Sheets-Sheet 1

INVENTOR
*Paul D. Abbott*

BY
*A. Yates Dowell*
ATTORNEY

April 24, 1962 P. D. ABBOTT 3,031,208
UNIVERSAL TRACTOR HITCH
Filed Oct. 25, 1960 3 Sheets-Sheet 2

INVENTOR
Paul D. Abbott

BY
ATTORNEY

April 24, 1962 P. D. ABBOTT 3,031,208
UNIVERSAL TRACTOR HITCH
Filed Oct. 25, 1960 3 Sheets-Sheet 3
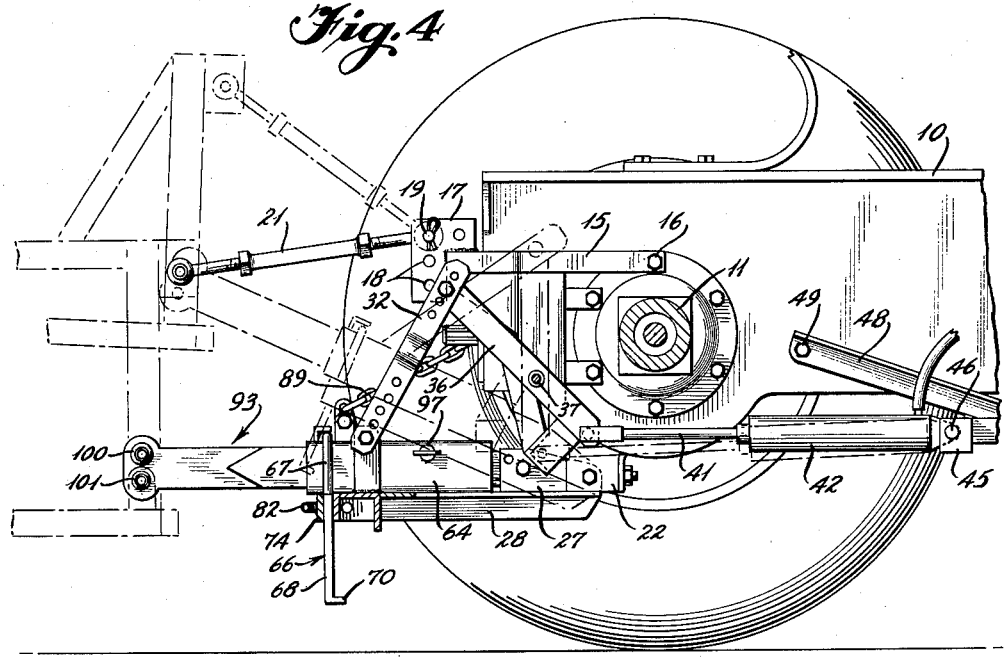
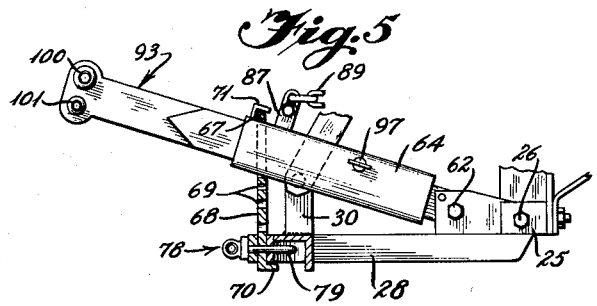
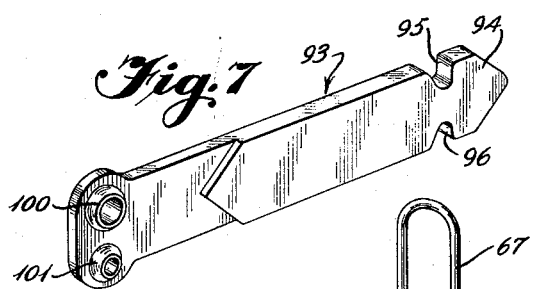
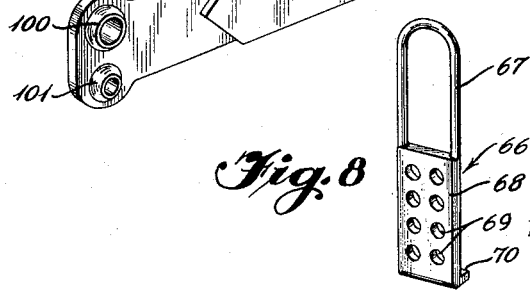
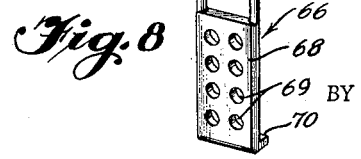
INVENTOR
Paul D. Abbott
BY
ATTORNEY United States Patent Office 3,031,208
Patented Apr. 24, 1962

3,031,208
UNIVERSAL TRACTOR HITCH
Paul D. Abbott, P.O. Box 92, Blytheville, Ark.
Filed Oct. 25, 1960, Ser. No. 64,756
5 Claims. (Cl. 280—460)

This invention relates to the treatment of the earth's surface to modify the topography thereof and to influence growth thereon, and to equipment by which the various operations are performed as well as the manner of operating such equipment.

The invention relates particularly to the manner of attaching implements used for cultivation or other treatment of the earth's surface and by which manner of attachment such implements can be properly operated and suitably controlled.

Heretofore tractor hitches have been produced which were inadequate and unsatisfactory due to the fact that they did not provide for the full operation and control of the implements and they were limited to implements usually of a specific kind and produced by a single manufacturer.

It is an object of the invention to provide a universal hitch by means of which an implement can be connected to and mounted upon a tractor and with such hitch affording full use of the implement regardless of make of the tractor or the implement or the number of connections between the same and the tractor.

Another object of the invention is to provide a hitch applicable to a tractor of any make for attaching any implement regardless of make to the tractor for controlling the elevation, lateral position and the pitch of implement, as well as an implement which can be readily applied and removed with minimum effort, and in a minimum of time by an individual either from the driver's position or a position on the ground.

A further object of the invention is to provide a relatively inexpensive, practical, serviceable, one, two or three point tractor hitch, which is sturdy, requires a minimum of maintenance, is of maximum durability, and relatively simple to operate.

Figure 1:
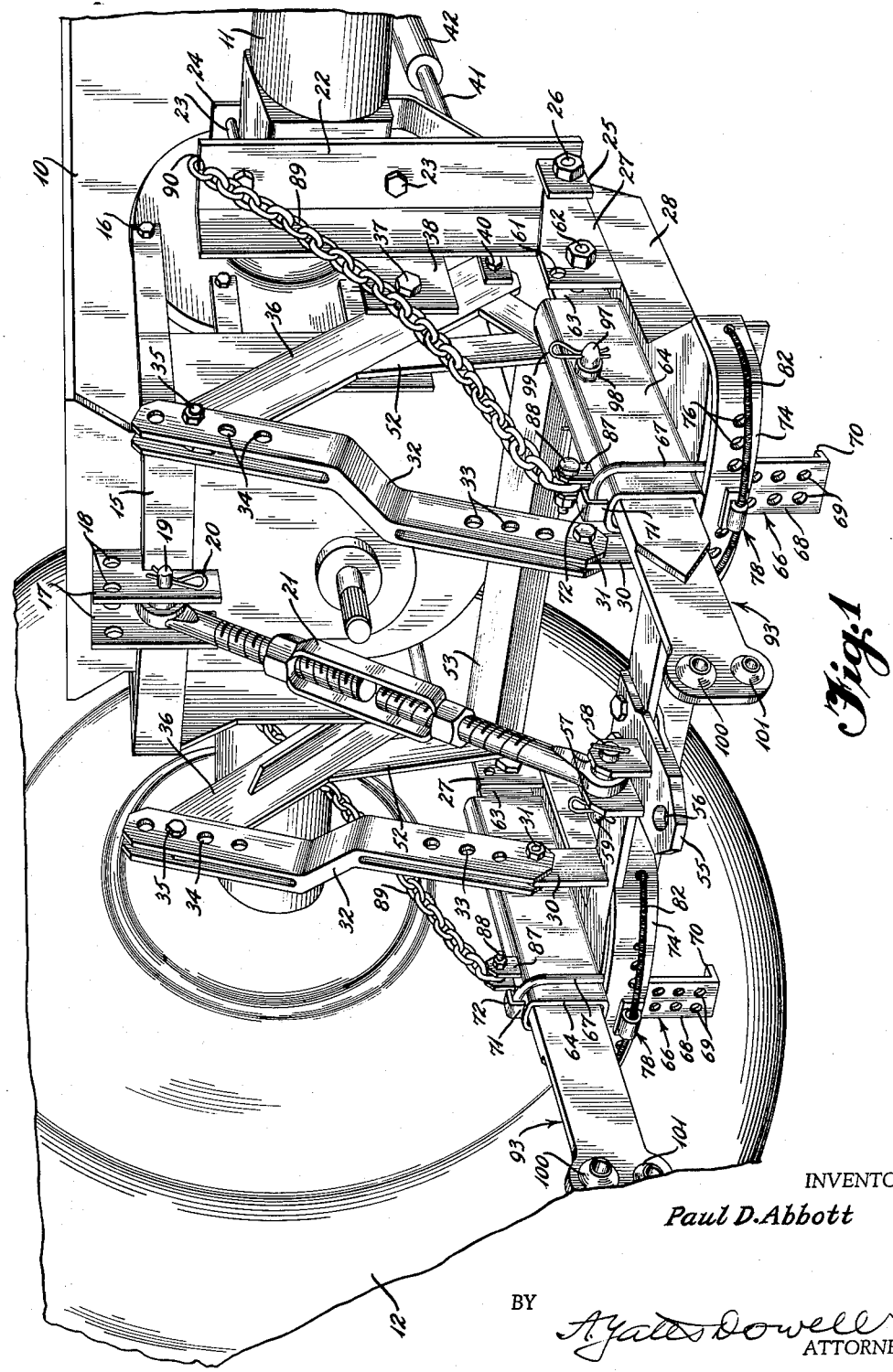
Figure 2:
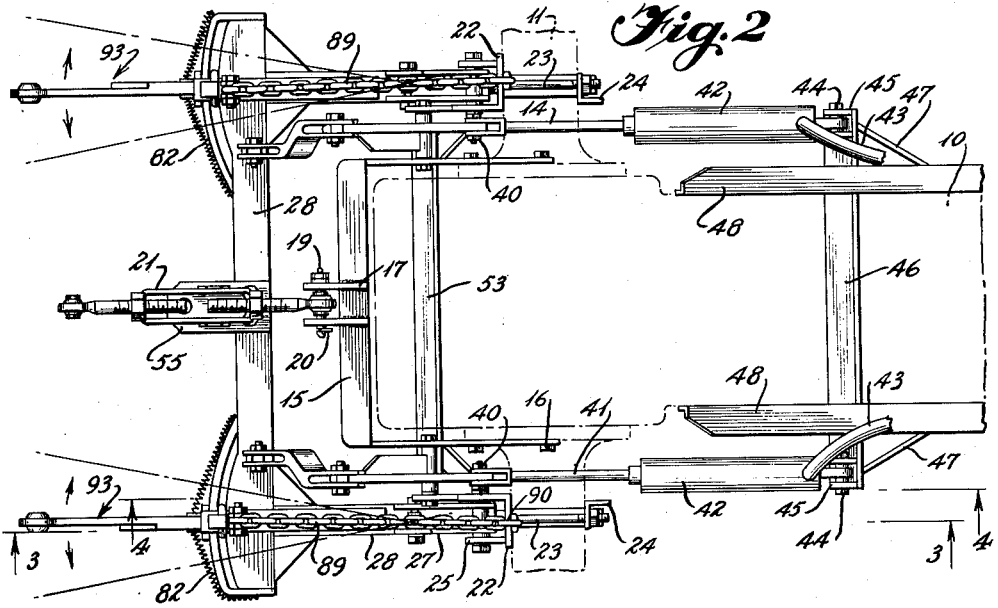
Figure 3:
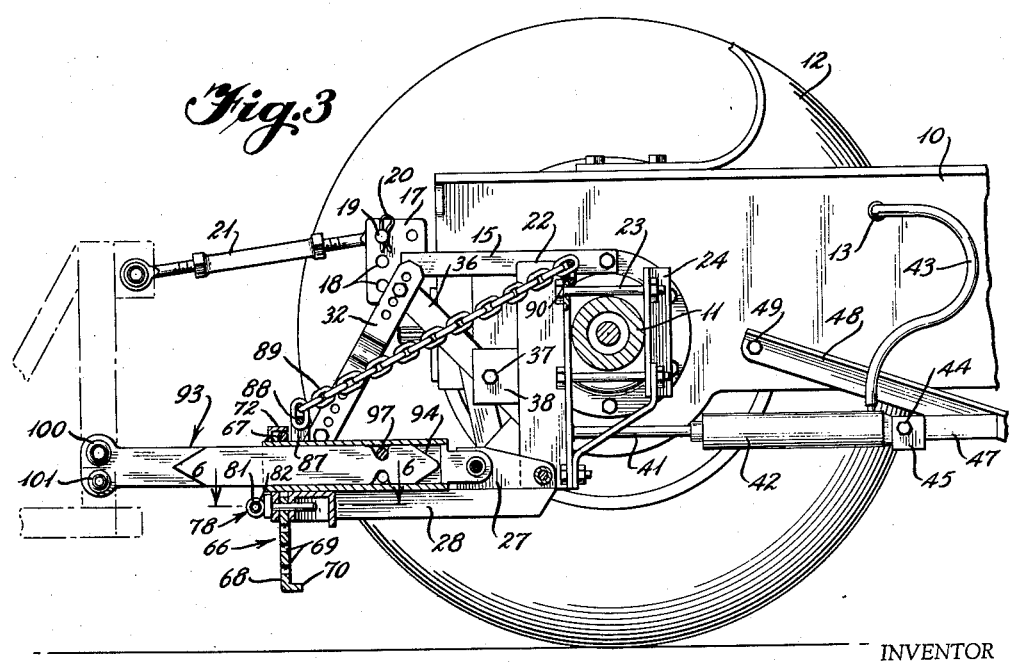

Other objects and advantages of the invention will be apparent from the following description taken in conjunction with the accompanying drawings, wherein:

FIG. 1 is a perspective of a tractor with one application of the invention applied thereto;

FIG. 2, a top plan view thereof;

FIG. 3, a section on the line 3—3 of FIG. 2;

FIG. 4, a section on the line 4—4 of FIG. 2;

FIG. 5, a fragmentary detail section of a portion illustrating the structure for elevational adjustment of the structure of FIG. 4 thereof;

FIG. 6, an enlarged fragmentary detail section on the line 6—6 of FIG. 3;

FIG. 7, an enlarged detail perspective of one of the hitch members; and

FIG. 8, an enlarged detail perspective of one of the sleeve adjusting plates.

Briefly stated, the present invention is a universal tractor hitch which may be applied to any conventional tractor and utilized to connect implements constructed to be attached by 1, 2 or 3 point connections to a tractor regardless of the manufacturer of the tractor or the implement. The hitch comprises a draw bar constructed to be raised and lowered while remaining substantially parallel to the axle of the tractor, and a pair of hitch members mounted on the draw bar and independently movable relative thereto. Means is provided for securing the hitch members in a fixed adjusted position before the implement is attached to the tractor or the operator can secure the hitch members in adjusted position without moving from his seat.

With continued reference to the drawings, a tractor 10 is provided of well known construction having a rear axle housing 11, ground engaging wheels 12 and a fluid pressure system 13.

The present invention is a universal implement hitch for application to the tractor 10 and comprises a generally U-shaped frame 15 for attachment to the rear of the tractor 10 by fasteners 16. A pair of brackets 17 having spaced cooperating openings 18 are secured in spaced relation on the connecting portion of the U-shaped frame 16 and such openings receive a pin 19 held in place by a cotter key 20. The pin 19 supports one end of a turnbuckle or other adjustable connecting member 21 which functions as the upper connection of a three point hitch or as a support for a one point hitch connection.

An angular mounting bracket 22 is clamped to the axle housing 11 on each side of the tractor by a pair of bolts 23 or other adjustable fasteners cooperating with an angular brace 24 the lower end of which may be fastened to the bracket 22. Each of the brackets 22 has a lug or mounting plate 25 welded or otherwise attached to the bottom portion thereof and such mounting plate supports one end of a pivot pin 26 the opposite end of which is supported by the flange of the bracket 22. The pin 26 pivotally supports a pair of hinge plates 27 fixed on a generally U-shaped draw bar 28 at each side of the tractor in a manner to permit the draw bar to be raised and lowered generally parallel to the earth.

The draw bar 28 is adapted to be raised and lowered by the hydraulic system 13 of the tractor. To accomplish this, the draw bar is provided with a pair of spaced upright lugs 30 each lug being connected by a pin 31 to an adjustable link 32 having a series of openings 33 in its lower end for the selective reception of the pin 31. The upper end of each link has a series of openings 34 in which a pivot pin 35 is selectively received, to connect the link to one end of a toggle lift bar 36 pivotally connected intermediate its ends by a pin 37 to a mounting plate 38 welded or otherwise attached to the flange of the bracket 22.

In order to raise and lower the toggle lift bar 36, the lower end of each bar is connected by a pin 40 to one end of a piston rod and piston 41 carried by a cylinder 42 connected by fluid lines 43 to the fluid pressure system 13 of the tractor. The remote end of each of the cylinders is connected by a pivot pin 44 to a pair of brackets 45 on a beam 46 which extends beneath the tractor and connects the cylinders 42 to cause such cylinders to operate in conjunction.

The beam 46 has a brace 47 secured to each end and the opposite end of each brace is fixed to an arm 48 mounted at its ends to the tractor 10 by fasteners 49. The toggle lift bars 36 preferably have depending brackets 52 connected by a cross brace 53 to maintain such lift bars in alignment and to equally distribute the fluid pressure force of the cylinders 42.

The draw bar 28 is provided with a mounting plate 55 located centrally of its connecting portion and such mounting plate has an opening 56 in its free end for the attachment of an implement having a single hitch. A pair of brackets 57 are attached to the mounting plate 55 and such brackets have openings 58 which receive a pin 59 to connect the end of the adjustable member 21 to the draw bar for the support thereof.

The rear ends of the hinge plate 27 on each side of the draw bar 28 have openings 61 in which a pin 62 is located to form a pivot for a plate 63 attached to one end of a sleeve or elongated hollow box 64. The plate 63 is provided with a ball type socket 65 having an opening therethrough for the reception of the pin 62 while permitting the plate 63 and its attached sleeve 64 to move horizontally as well as vertically.

The opposite ends of the sleeves 64 are adjustable horizontally to accommodate implements having different spacings between their hitches and are independently adjustable vertically to change the pitch of the implements. In order to do this, the free end of each sleeve is held by an adjusting member 66 having a substantially U-shaped rod 67 which encompasses the sleeve 64 and is attached to the upper end of a plate 68 in which are located a plurality of cooperating pairs of openings 69. The bottom of the plate is provided with an inturned flange or lip 70 for a purpose which will be described.

An angle bracket or stop 71 having a forwardly extending flange 72 is welded or otherwise attached to the top of the sleeve 64 and is located so that the flange 72 overlies the rod 67 whereby when the member 66 is raised the rod 67 will strike the flange 72 and raise the sleeve. The plate 66 is mounted between a pair of arcuate plates 74 and 75 having equally spaced openings 76 and 77, respectively, with the spacing of such openings being substantially the same as the openings 69 in the plate 68.

In order to fix the member 66 in adjusted position a lock 78 is provided having a pair of pins 79 spaced apart a distance corresponding to the spacing of the openings, 69, 76 and 77 and mounted on a base 80. A sleeve 81 is welded or otherwise attached to the base 80 on the side opposite the pins 79. The lock 78 is maintained in position by a spring 82 which is fixed at one end to the plate 74, by a fastener 83 and extends along the outer surface of such plate and through the sleeve 81 and is secured at the opposite end of such plate by a fastener 84. In use the plate 66 is raised or lowered and moved radially between plates 74 and 75 until the openings 69 are in alignment with the openings 76 and 77, whereupon the lock 78 is moved rearwardly against the tension of spring 82 until the pins 79 can be aligned with the openings and inserted therein.

The lock 78 is prevented from accidentally being withdrawn due to vibrations of the tractor by the tension of the spring 82 and the lip 70 on the bottom of the member 66 will prevent such member from being withdrawn from between the arcuate plates 74 and 75. If it is desired to remove the sleeve 64 from within the confines of the U-shaped rod 77, the pivot pin 62 at the opposite end of the sleeve must be removed and the sleeve pivoted about the connection between the angle member 71 and the rod 67 until the end of the sleeve passes through the U-shaped rod 67, whereupon the angle member 71 can be removed from such rod.

If the operator of the tractor wishes to independently adjust the angle of elevation of the sleeve 64 the lock 78 is not mounted in the openings 69, 76 and 77 but instead is left hanging from the spring 82. Each of the sleeves 64 has a pair of brackets 87 attached to the top thereof and such brackets are connected by a pin 88 to the end link of a chain 89. The free end of such chain extends upwardly and is positioned within a notch 90 in the top of the bracket 22. In order for the operator of the tractor to maintain one of the sleeves 64 at a different elevation than that of the other sleeve and thereby regulate the amount of pitch of the implement, the draw bar 28 is raised to the height desired for the sleeve and the chain 89 is removed from the notch 90 and pulled taut and then one of the links is reinserted in the notch, after which the draw bar 28 is lowered.

Each of the sleeves 64 receives a tongue 93 having a pointed end 94 which is inserted into the sleeve. A pair of opposed slots or notches 95 and 96 are provided in the side edges of the tongues 93 adjacent to the pointed end 94 and one of such slots receives a pin 97 carried in bosses 98 in the upper portion of the sleeve 64 and prevented from being accidentally withdrawn therefrom by a cotter pin 99. The tongues 93 are reversible to align either the slot 95 or the slot 96 with the bosses 98 whereby the pin 97 will maintain the tongue in position regardless of which side of the tongue is uppermost. The opposite end of the tongue is provided with a pair of ball and socket joints 100 and 101 having connecting pin openings therein. The opening in the socket 100 is somewhat larger than the opening in the socket 101 to accommodate connecting pins of various implements.

In the operation of the device an implement having a single hitch connection is attached to the mounting plate 55 in the center of the draw bar. The adjustable connecting member 21 is supported at one end by the U-shaped frame 16 and the opposite end supports the draw bar 28 so that pressure does not have to be maintained on the hydraulic system 13 of the tractor during the entire operation of the implement.

An implement having a two point hitch connection is attached to the tongues 93 and such tongues are inserted into the sleeves 64. The sleeves are adjustable both horizontally and vertically and are adapted to be fixed in such adjusted position by the adjusting members 66 or by the chains 89 each having one end attached to the outer ends of one of the sleeves and the opposite end retained within a notch 90 in the bracket 22. When the implement being used has a two point hitch, the adjustable connecting member 21 is preferably removed from the tractor.

An implement having a three point hitch connection is attached to the tongues 93 in the same manner as utilized by the two point hitch connection and the third point of connection is attached to the adjustable connecting member 21.

The tongues 93 and sleeves 64 are adjustable laterally to accommodate implements having various spacings between their connections and are independently adjustable vertically to vary the pitch of the implement.

It will be obvious to one skilled in the art that various changes may be made in the invention without departing from the spirit and scope thereof and therefore the invention is not limited by that which is illustrated in the drawings and described in the specification but only as indicated in the accompanying claims.

What is claimed is:

1. A universal one, two or three point hitch for mounting an implement on a tractor having a rear axle and a fluid pressure system, comprising a substantially U-shaped bracket for attachment to the tractor adjacent the rear of the same, a pair of angular mounting brackets attached one at each side of the tractor, a U-shaped draw bar pivotally connected by said angular mounting brackets, a mounting plate located centrally of said U-shaped draw bar providing an attachment for an implement having a single hitch, a toggle lift bar attached to said U-shaped draw bar and pivotally mounted on each of said angular mounting brackets, fluid actuated means for operating said lift bars subject to the fluid pressure system of the tractor, an elongated hollow sleeve forming structure pivotally attached at one end to each side of the draw bar, a vertically and horizontally adjustable member connected to the free end of said sleeve, means for securing said vertically and horizontally adjustable members in adjusted position, a tongue removably mounted in each of said sleeves, said tongues having at least one universal joint for attachment to an implement whereby implements of either one or two or three point hitch construction may be joined to a tractor.

2. A universal one, two or three point hitch for mounting an implement on a tractor having a rear axle and a fluid pressure system, said hitch comprising a bracket for attachment to the rear axle of the tractor, a pair of spaced mounting brackets attached to the tractor, a draw bar carried by said mounting brackets, a mounting member located centrally of said draw bar and providing for the attachment of an implement having a single hitch, a pair of toggle lift bars connected to said draw bar, said draw bar being carried by said spaced mounting brackets connected to the tractor, fluid means for operating said lift bars in accordance with the operation of the fluid system of the tractor, cooperating implement mounting members for connecting an implement to said draw bar, structure for adjusting the horizontal and vertical positions of said cooperating members, said cooperating members having at least one universal joint for attachment to an implement for performing work and enabling the connection to the tractor of implements of various kinds for performing work and regardless of whether such implements are of the one, two or three point hitch variety and irrespective of the spacing of the implement hitch.

3. A universal one, two or three point hitch for mounting an implement on a tractor having a rear axle and a fluid pressure system, comprising a pair of mounting brackets attached one at each side of the tractor, a U-shaped draw bar pivotally connected by said mounting brackets, a mounting plate located centrally of said U-shaped draw bar providing an attachment for an implement having a single hitch, a toggle lift bar attached to said U-shaped draw bar and pivotally mounted on each of said mounting brackets, fluid actuated means for operating said lift bars subject to the fluid pressure system of the tractor, elongated structure pivotally attached at one end to each side of the draw bar, a vertically and horizontally adjustable member connected to the free end of said elongated structure, means for securing said vertically and horizontally adjustable members in adjusted position, and a tongue movably mounted with regard to said elongated structure.

4. A universal hitch for mounting an implement on a tractor comprising a pair of mounting brackets attached one at each side of the tractor, a draw bar interconnecting and pivotally connected to said mounting brackets, a mounting plate located centrally of said draw bar and providing an attachment for an implement having a single hitch, a toggle lift bar attached to said draw bar and pivotally mounted on each of said mounting brackets, fluid actuated means for operating said lift bars, an elongated implement attaching member pivotally attached at one end to each side of the draw bar, an adjustable member connected to the free end of said elongated member for securing said members in vertically and horizontally adjusted position.

5. A universal hitch for mounting an implement on a tractor comprising a pair of mounting brackets attached one at each side of the tractor, a draw bar interconnecting and pivotally connected to said mounting brackets, a toggle lift bar attached to said draw bar and pivotally mounted on each of said mounting brackets, fluid actuated means for operating said lift bars, an elongated implement attaching member pivotally attached at one end to each side of the draw bar, an adjustable member connected to the free end of said elongated member for securing said members in vertically and horizontally adjusted position.

References Cited in the file of this patent

UNITED STATES PATENTS

| | | |
|---|---|---|
| 2,611,304 | Toland | Sept. 23, 1952 |
| 2,693,969 | Simpson | Nov. 9, 1954 |
| 2,779,260 | Orelind | Jan. 29, 1957 |

FOREIGN PATENTS

| | | |
|---|---|---|
| 647,622 | Great Britain | Dec. 20, 1950 |
| 780,670 | Great Britain | Aug. 7, 1957 |